(12) United States Patent  
Aoki et al.

(10) Patent No.: US 9,427,846 B2  
(45) Date of Patent: Aug. 30, 2016

(54) ABRASIVE ARTICLE

(71) Applicants: SAINT-GOBAIN ABRASIVES, INC., Worcester, MA (US); SAINT-GOBAIN ABRASIFS, Conflans-Sainte-Honorine (FR)

(72) Inventors: Satoshi Aoki, Isumi (JP); Hiromi Shiraishi, Isumi (JP)

(73) Assignees: SAINT-GOBAIN ABRASIVES, INC., Worcester, MA (US); SAINT-GOBAIN ABRASIFS, Conflans-Sainte-Honorine (FR)

( * ) Notice: Subject to any disclaimer, the term of this patent is extended or adjusted under 35 U.S.C. 154(b) by 0 days.

(21) Appl. No.: 14/466,597

(22) Filed: Aug. 22, 2014

(65) Prior Publication Data

US 2015/0056901 A1    Feb. 26, 2015

(30) Foreign Application Priority Data

Aug. 23, 2013   (JP) ................................ 2013-173640

(51) Int. Cl.
    *B24D 5/12*      (2006.01)
    *B28D 1/12*      (2006.01)
    *B24D 5/06*      (2006.01)
    (Continued)

(52) U.S. Cl.
CPC .............. *B24D 5/12* (2013.01); *B23D 61/021* (2013.01); *B23D 61/04* (2013.01); *B24D 5/06* (2013.01); *B24D 5/123* (2013.01); *B28D 1/121* (2013.01)

(58) Field of Classification Search
CPC ......... B24B 5/12; B24B 5/06; B23D 61/021; B23D 61/04; B28D 1/121
See application file for complete search history.

(56) References Cited

U.S. PATENT DOCUMENTS

| | | | |
|---|---|---|---|
| 6,408,838 B1 | 6/2002 | Ogata et al. | |
| 6,638,152 B1* | 10/2003 | Kim | B23D 61/021 |
| | | | 451/541 |
| 6,638,153 B2* | 10/2003 | Lee | B24D 3/06 |
| | | | 125/12 |

(Continued)

FOREIGN PATENT DOCUMENTS

| | | |
|---|---|---|
| JP | H02-150156 U | 12/1990 |
| JP | H06-000659 U | 1/1994 |

(Continued)

OTHER PUBLICATIONS

International Search Report from PCT/US2014/052340 mailed Dec. 11, 2014, 1 page.

*Primary Examiner* — Dung Van Nguyen
(74) *Attorney, Agent, or Firm* — Abel Law Group, LLP; Joseph P Sullivan

(57) ABSTRACT

An abrasive article that may include a circular substrate with a plurality of segments arranged on the circumferential surface of the circular substrate. The abrasive article may also include an outlet slot defining an open space on a peripheral portion of the abrasive article between a first segment and a second segment, a center slot defining an open space in the circular substrate connected to the outlet slot, a noise absorbing hole connected to the center slot and protruding from the center slot in the rotating direction of the abrasive article, and a ratio $(H+X)/CS_D$ of at least about 0.01, where H represents a prescribed height of the noise absorbing hole, X represents a prescribed depth of the noise absorbing hole and $CS_D$ represents the diameter of the circular substrate.

20 Claims, 6 Drawing Sheets

(51) Int. Cl.
*B23D 61/02* (2006.01)
*B23D 61/04* (2006.01)

(56) References Cited

U.S. PATENT DOCUMENTS

| | | | | |
|---|---|---|---|---|
| 6,872,133 | B2* | 3/2005 | Lee | B28D 1/121 125/15 |
| 2003/0019489 | A1* | 1/2003 | Ogata | B24D 3/34 125/15 |
| 2003/0029296 | A1* | 2/2003 | Donazzan | B23D 47/005 83/835 |
| 2005/0193866 | A1* | 9/2005 | Woo | B23D 61/026 76/112 |
| 2010/0199964 | A1 | 8/2010 | Baron | |
| 2014/0010998 | A1* | 1/2014 | Hoang | B24D 5/123 428/172 |
| 2014/0187131 | A1* | 7/2014 | Hoang | B23D 61/04 451/542 |
| 2014/0373693 | A1* | 12/2014 | Gosamo | B28D 1/121 83/39 |

FOREIGN PATENT DOCUMENTS

| | | |
|---|---|---|
| JP | 3000263 U | 8/1994 |
| JP | 2000-094338 A | 4/2000 |
| JP | 2000-108039 A | 4/2000 |
| JP | 2000094338 A | 4/2000 |
| JP | 2001-018174 A | 1/2001 |
| JP | 3088724 U | 9/2002 |
| JP | 3347675 B2 | 11/2002 |
| JP | 3444819 B2 | 9/2003 |
| JP | 2009012157 A | 1/2009 |

* cited by examiner

ABRASIVE ARTICLE

CROSS-REFERENCE TO RELATED APPLICATION

The present application claims priority from Japanese Patent Application No. 2013-173640, filed Aug. 23, 2013, entitled "Cutting Blade," naming inventors Satoshi Aoki and Hiromi Shirashi, which application is incorporated by reference herein its entirety.

FIELD OF THE DISCLOSURE

The present invention relates to an abrasive article for cutting stone materials, concrete and the like and particularly to an abrasive article that generates reduced noise during use.

DESCRIPTION OF THE RELATED ART

Conventional tools for cutting stone materials, concrete and the like, include abrasive articles made by soldering or laser welding diamond or a segment chip produced by mixing and baking a super abrasive grain, such as CBN, and metal powder, such as Ni and Co, on the peripheral surface of a circular substrate. In this type of abrasive article, noise generated during cutting is a problem, and therefore, various types of noise-absorbing abrasive articles have been proposed. Yet, recently a need to reduce noise is needed, not only at the time of cutting but at the time of idling an abrasive article at a high speed as well.

A description of a substrate slit structure for a conventional noise-absorbing cutting blade described in Japanese Patent No. 3347675 (hereinafter "Patent Literature 1") is given below. The substrate slit structure of a cutting tool includes irregularity that is provided on both end surfaces of a slit, wherein an air vortex generated at the concave part and the convex part cancels out a large air vortex generated by the entire slit, which suppresses the intrinsic vibrational mode of a substrate and lowers wind noise generated during rotation of the cutting tool.

As to the conventional technology described in Patent Literature 1, a prototype of the cutting tool was made and evaluated based on the noise level generated during cutting or idling. The noise level at around 2 KHz, which typically causes noise problems, was higher than the noise level allowable at an actual construction site. Although the production conditions and use conditions described in the present application may be different from the production conditions and use conditions used by the present applicant, it is anyway difficult to stably lower noise because noise, such as wind noise, occur when production conditions and use conditions are slightly changed.

A description of a second conventional noise-absorbing technology described in Japanese Utility Model Application Kokai Publication No. H06-659 (hereinafter "Patent Literature 2") is given below. The cutting tool described in this application includes segment chips that are arranged on the peripheral end surface of a disk-shaped substrate at constant intervals and a plurality of substrate slits that are provided between the segment chips at different angles in the range of −10 degrees to +10 degrees relative to the radial direction. Since the direction and size of air vortices generated at the time of rotating the cutting grind are different among those slits, they are cancelled out, and thereby wind noise is reduced.

Although the conventional technology described in Patent Literature 2 attempts to lower noise by changing the angle of a slit relative to another slit, the tilted angle of a slit must be redesigned each time based on various conditions, such as, the number of revolutions, outer diameter and the like of an abrasive article.

A description of a third conventional technology described in Japanese Patent No. 3444819 (hereinafter "Patent Literature 3") is given below. Although the purpose of this conventional technology is not to reduce noise, the abrasive article described in this patent includes a slit and a circular hole connected to this slit located at the outer periphery of a substrate, which prevents the generation of turbulence at the outer periphery of the circular hole. Next, the patent describes rotating disk-shaped blade as shown in FIG. 5. When rotating the disk-shaped blade, segment chips 52 are arranged on the circumferential surface of a substrate 51 at constant intervals and slits 53 and 54, which have different slit lengths are alternately disposed between segment chips 52 around the peripheral circumference of the substrate.

If there is a cornered part or an irregular part inside a slit, chips around a segment chip tends to stay put, and therefore, the inner surface of a circular hole 55 and the slit 53 or 54 have a continuous shape with no level difference. More specifically, the configuration is such that a circular hole is decentered in the direction opposite to the rotational direction of the rotating disk-shaped blade, or the slit width at a portion of the slit that is parallel with the radial direction of a substrate is widened. This type of configuration prevents abrasion from occurring at the border between the segment chip 52 and the substrate 51, which is otherwise caused by chips flowing into the slit, particularly when the flow of those chips is disturbed by turbulence or when those chips stay put locally.

Although the rotating disk-shaped abrasive article described in Patent Literature 3 is characterized by having a configuration of decentering a circular hole in the direction opposite to the rotational direction of the rotating disk-shaped abrasive article or widening the slit width at a portion of the slit that is parallel with the radial direction of a substrate, nothing is described about noise at a high sound range. In other words, the abrasive article according to embodiments described herein is essentially directed to a noise-absorbing hole that lowers wind noise, while Patent Literature 3 neither describes nor suggests a noise-absorbing hole.

Further, an abrasive article similar to the rotating disk-shaped abrasive article described in the Patent Literature 3 was made and evaluated based on the noise level during cutting or idling. The abrasive article showed hardly any noise-reducing effect. It is presumed that the rotating disk-shaped abrasive article described in Patent Literature 3 has a circular hole 55 for the purpose of reducing heat wear by slightly decentering the circular hole 55 for the length of its radius in the opposite rotating direction. Therefore it is assumed that this circular hole 55 essentially has no function of reducing wind noise.

SUMMARY

According to a first aspect, an abrasive article may include a circular substrate with a plurality of segments arranged on the circumferential surface of the circular substrate. The abrasive article may also include an outlet slot defining an open space on a peripheral portion of the abrasive article between a first segment and a second segment. The abrasive article may also include a center slot defining an open space in the circular substrate connected to the outlet slot, a noise absorbing hole connected to the center slot and protruding from the center slot in the rotating direction of the abrasive article, and a ratio $(H+X)/CS_D$ of at least about 0.01, where H represents a prescribed height of the noise absorbing hole, X represents a prescribed depth of the noise absorbing hole and $CS_D$ represents the diameter of the circular substrate.

According to another aspect, an abrasive article may include a circular substrate with a plurality of segments arranged on the circumferential surface of the circular substrate. The abrasive article may also include an outlet slot defining an open space on a peripheral portion of the abrasive article between a first segment and a second segment. The abrasive article may also include a center slot defining an open space in the circular substrate connected to the outlet slot, a noise absorbing hole connected to the center slot and protruding from the center slot in the rotating direction of the abrasive article, and a ratio $(H+X)/CSc$ of at least about 0.003, where H represents a prescribed height of the noise absorbing hole, X represents a prescribed depth of the noise absorbing hole and $CS_c$ represents the circumference of the circular substrate.

According to another aspect, an abrasive article may include a circular substrate with a plurality of segments arranged on the circumferential surface of the circular substrate. The abrasive article may also include an outlet slot defining an open space on a peripheral portion of the abrasive article between a first segment and a second segment. The abrasive article may also include a center slot defining an open space in the circular substrate connected to the outlet slot, a noise absorbing hole connected to the center slot and protruding from the center slot in the rotating direction of the abrasive article. The abrasive article may also include a ratio $H/CS_D$ of at least about 0.005, a ratio $X/CS_D$ of at least about 0.005 or a ratio $FL/CS_D$ of at least about 0.0075, where H represents a prescribed height of the noise absorbing hole, X represents a prescribed depth of the noise absorbing hole, FL represents a prescribed full length of the center slot and the noise absorbing hole and $CS_D$ represents the diameter of the circular substrate.

According to still another aspect, an abrasive article may include a circular substrate with a plurality of segments arranged on the circumferential surface of the circular substrate. The abrasive article may also include an outlet slot defining an open space on a peripheral portion of the abrasive article between a first segment and a second segment. The abrasive article may also include a center slot defining an open space in the circular substrate connected to the outlet slot, a noise absorbing hole connected to the center slot and protruding from the center slot in the rotating direction of the abrasive article. The abrasive article may also include a ratio $H/CS_C$ of at least about 0.0015, a ratio $X/CS_C$ of at least about 0.0015 or a ratio $FL/CSc$ of at least about 0.002, where H represents a prescribed height of the noise absorbing hole, X represents a prescribed depth of the noise absorbing hole, FL represents a prescribed full length of the center slot and $CS_C$ represents the circumference of the circular substrate.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

According to an embodiment, the abrasive article described herein can include a core and a plurality of abrasive segments affixed to the core. The abrasive article may be used to remove material from various workpieces by movement of the abrasive article relative to the workpiece. According to certain embodiments, the abrasive article can be a grinding tool for grinding metal, concrete, or natural stone. According to still other embodiments, the abrasive article can be a cutting tool for cutting construction materials, such as a saw for cutting concrete.

The abrasive article formed according to embodiments described herein may stably and surely lower the noise level caused by wind noise and the like generated during tool use to a level equal to or lower than an allowable level at the maximum revolution speed of the abrasive article.

Moreover, the abrasive article formed according to embodiments described herein is provided with slots and noise-absorbing holes connected and oriented in such a way that the generation of noise levels during too use is reduced and mechanical strength of the entire abrasive article does not decline. Moreover, the abrasive article is formed such that no strong vibration associated with the generation of wind noise occurs. Therefore, the reliability of the abrasive article can be enhanced and the use life of the abrasive article prolonged. Accordingly, operators can work in an excellent work environment and work efficiency improves.

Figure 1A:
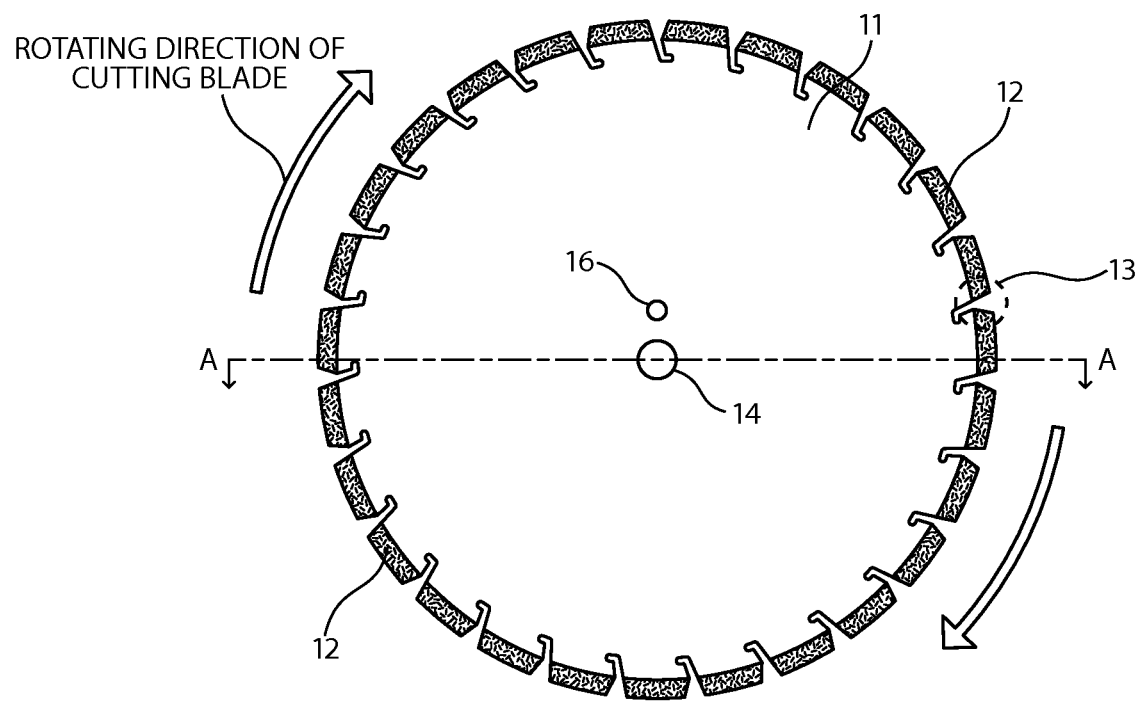
FIG. 1(a) includes a plan view of an abrasive article according to an embodiment.
Figure 1B:
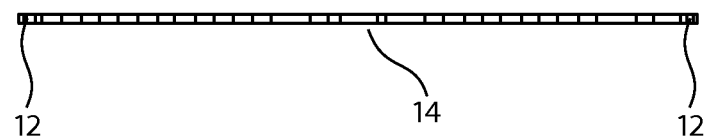
FIG. 1(b) includes a sectional view along an A-A line in FIG. 1(a).

Furthermore, an abrasive article formed according to embodiments described herein enables chips to be exhausted in an excellent manner by properly setting the width, height and angle of a slot as well as the depth of a noise-absorbing hole. The embodiment also enables smooth supply of cooling water via the slot. Accordingly, tool wear can be significantly be improved A description of an abrasive article formed according to an embodiment described herein is given below with reference to the figures. FIG. 1(a) is a plan view of an abrasive article according to an embodiment described herein and FIG. 1(b) is a sectional view along an A-A line in FIG. 1(a). As shown in FIG. 1(a), an abrasive article may include segment chips 12 formed by mixing and baking super abrasive grains and a binder such as metal powder. The segment chips 12 may be connected to the outer peripheral surface of a metallic circular substrate 11, which may be made of carbon tool steel (SK material). The segment chips 12 may be connected at equal intervals around the outer peripheral surface of the metallic circular substrate 11 by soldering or laser welding.

According to a particular embodiment, a slot 13 may be formed approximately in the radial direction of the abrasive article between segment chips 12. The slot 13 may allow grinding liquid, such as cooling water, to be smoothly supplied to a grinding portion of the abrasive article in order to not only cool the grinding portion, but also to discharge chips generated during grinding. Moreover, the slot 13 functions to prevent stress concentration and to mitigate cutting impact during cutting of concrete or the like by the abrasive article. Reference numerals 14 and 16 are respectively a center hole and a fixing pin hole. A rotating axis of a driving engine provided on a cutting device (not shown here) may pass through center hole 14 and the fixing pin hole 15 is used for fixing the abrasive article. According to this particular embodiment, as shown in FIG. 1, the abrasive article may be rotated at a prescribed revolution speed in the cutting direction of the abrasive article (e.g., in the clockwise direction) such that the segment chips 12 may cut into a paved concrete surface or the like.

Figure 2A:
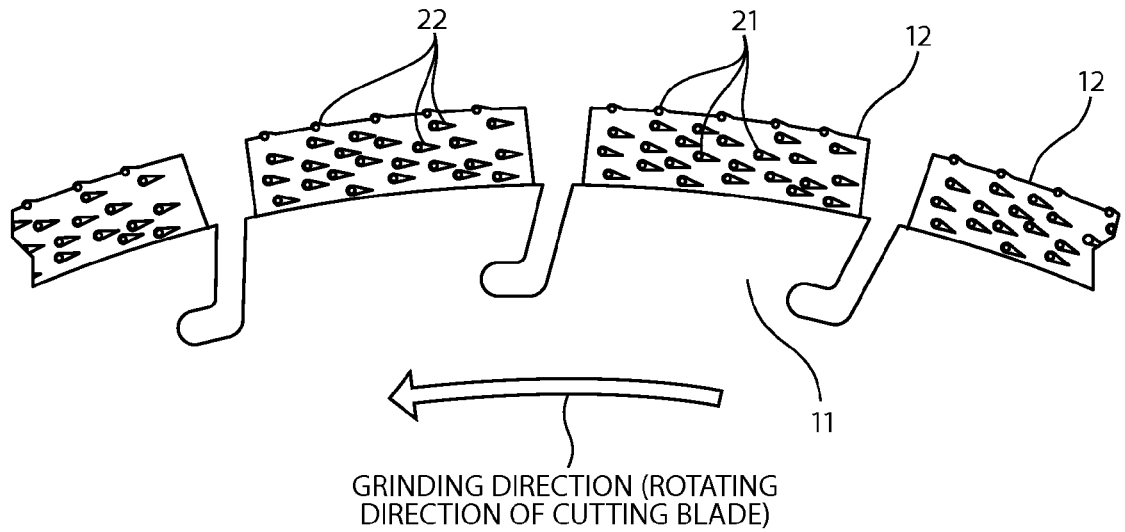
FIG. 2(a) includes an explanatory view showing the relationship between the rotating direction of an abrasive article and the structure of a segment chip.
Figure 2B:
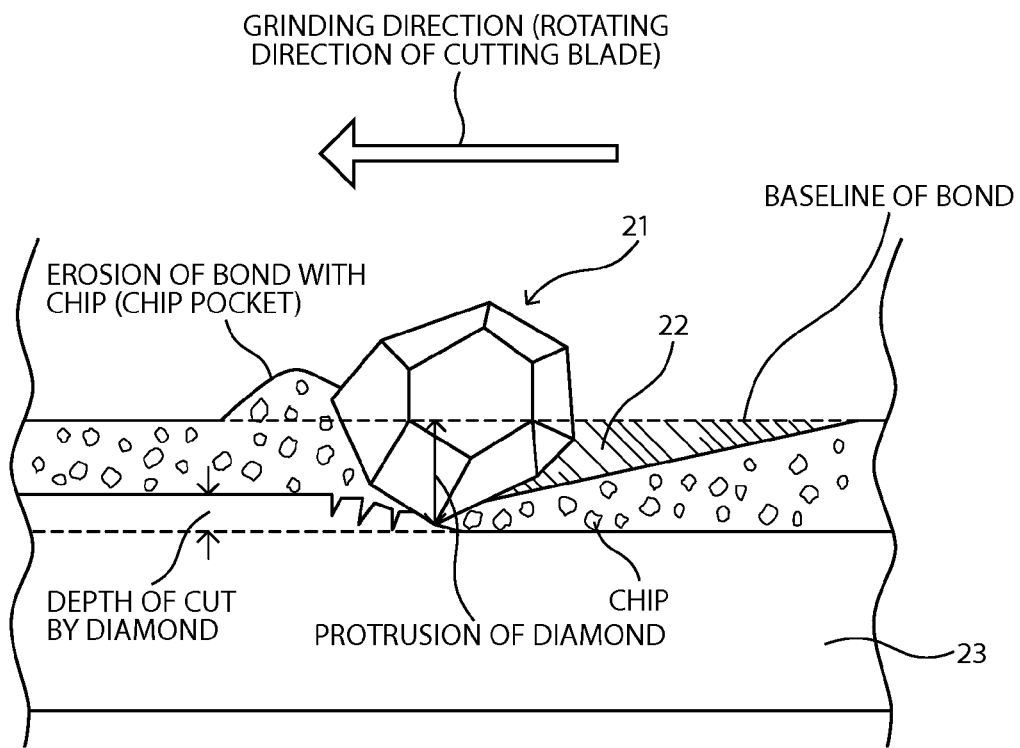
FIG. 2(b) includes a partially enlarged view of FIG. 2(a).

Next, FIGS. 2(*a*) and (*b*) illustrate the rotational direction of the abrasive article and the structure of the segment chip. As shown in FIG. 2(*a*), the segment chip 12 is connected to the outer peripheral surface of the circular substrate 11. Segment chip 12 is formed by mixing metal powder and a super abrasive grain 21, such as diamond, filling a stipulated amount of the mixture into a graphite mold for baking, and then baking the mixture by heating it under pressure. The initially baked segment chip 12 has no cutting function because the super abrasive grain 21 has no protrusion when the segment is initially formed. Therefore, after the segment chip 12 is connected to the circular substrate 11, the segment chip 12 is ground by a grinder in a direction that corresponds to the intended rotational direction of the abrasive article. In other words, dressing of the segment chip 12 to cause exposure and protrusion of the super abrasive grain 21 is performed in a direction that corresponds with the intended rotational direction of the abrasive article. As shown in FIG. 2(*b*), dressing the segment chip 12 exposes the super abrasive grain 21 to make the abrasive grain 21 an abrasive article on the anterior side in the intended rotational direction of the abrasive article. The abrasive grain 21 further has a portion (bond tail) 22 in which metal powder is not removed on the posterior end in the intended rotational direction of the abrasive article.

This bond tail 22 holds the super abrasive grain 21 against grinding resistance in order to prevent the super abrasive grain 21 from falling out of the segment chip 12. Accordingly, if the abrasive article is used in the direction opposite to the intended rotational direction of the abrasive article, as specified by the dressing procedure, cutting capabilities of the cutting bade cannot be achieved because the super abrasive grain 21 is brought into contact with a work material 23 where the super abrasive grain 21 is not exposed. Consequently, the super abrasive grain 21 falls out because the holding power against cutting resistance in the direction opposite to the intended rotational direction of the abrasive article is extremely week and therefore, the abrasive article does not function as a cutting tool.

Figure 3:
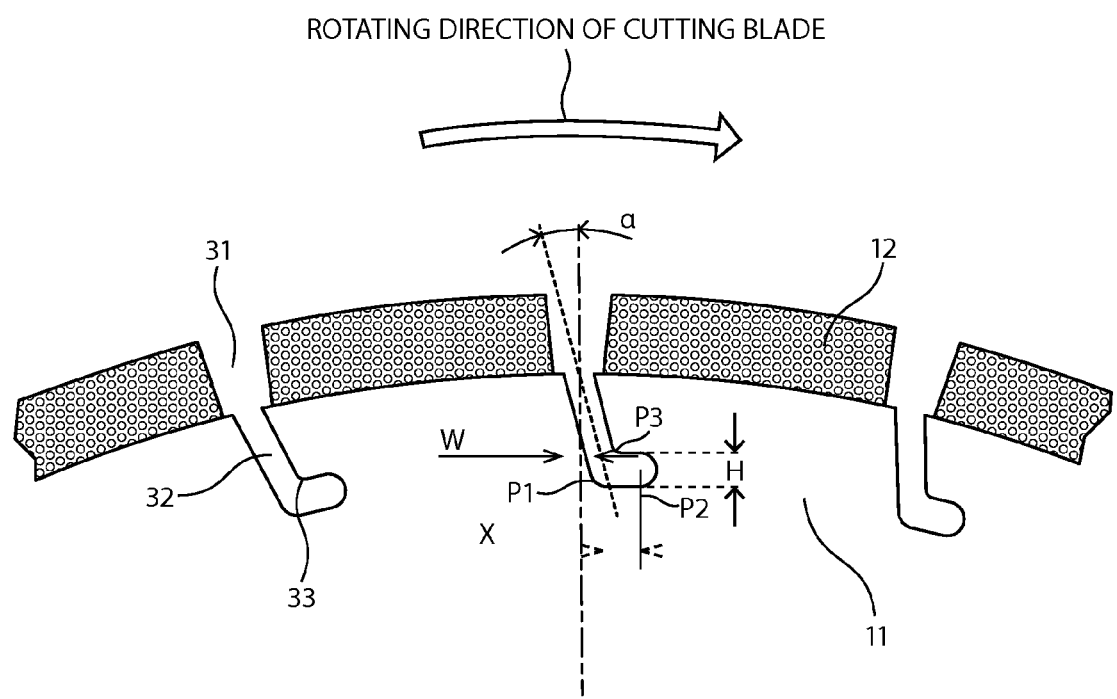
FIG. 3 includes a partially enlarged view of the abrasive article shown in FIG. 1(a).

Next, FIG. 3 illustrates the slot 13 and the noise-absorbing hole 33 in more detail according to a particular embodiment. As shown in FIG. 3, an outlet slot 31 is provided between segment chips 12. The outlet slot 31 is connected to a center slot 32 provided in the circular substrate 11. The outlet slot 31 is oriented at an angle α in the radial direction of the circular substrate 11. The center slot 32 is connected to a noise-absorbing hole 33 and is formed approximately in the circumferential direction of the circular substrate 11 relative to the outlet. Moreover, W, X and H show the width of the center slot 32, the depth of the noise-absorbing hole 33, and the height of the noise-absorbing hole 33, respectively. As shown in FIG. 3, the noise-absorbing hole 33 extends from a position P1 approximately in the horizontal direction relative to the grinding direction (the rotating direction of the abrasive article), and at a position P2, the noise-absorbing hole 33 is formed approximately along an arc. Similarly, the wall of the noise-absorbing hole 33 on the opposite side of the position P1 extends from a position P3 approximately in the horizontal direction relative to the rotating direction. Here, the position P1 and the position P3 show positions on the borderline between the center slot 32 and the noise-absorbing hole 33. The depth X of the noise-absorbing hole 33 is defined as a length between the intermediate position between the position P1 and the position P3 in the horizontal direction and the position P2, as shown in FIG. 3, yet this is only one definition, and any other definition may be adopted as far as it is a size representing the depth of the noise-absorbing hole 33 from a connecting part between the center slot 32 and the noise-absorbing hole 33. Furthermore, according to this particular embodiment, the noise-absorbing hole 33 is formed from the position P2 as an arc in the rotating direction. According to still other embodiments, other shapes may be acceptable. According to yet another embodiment, a super steel chip may be provided along the wall of the center slot 32 to measures against to wear. In this case, the width W of the center slot 32 may become smaller than a width in case where no super steel chip is provided.

According to one particular embodiment, an abrasive article may include a particular ratio $(H+X)/CS_D$, where H represents a prescribed height of a noise absorbing hole of the abrasive article, X represents a prescribed depth of the noise absorbing hole of the abrasive article and $CS_D$ represents a diameter of the circular substrate of the abrasive article. For example, the abrasive article may include a ratio $(H+X)/CS_D$ of at least about 0.01, such as, at least about 0.02, at least about 0.03, at least about 0.035, at least about 0.04, at least about 0.045, at least about 0.05, at least about 0.055, at least about 0.06, at least about 0.065, at least about 0.07, at least about 0.075, at least about 0.08, at least about 0.085, at least about 0.09, at least about 0.095 or even at least about 0.1. According to still another embodiment, the abrasive article may include a ratio $(H+X)/CS_D$ of not greater than about 0.2, such as, not greater than about 0.15, not greater than about 0.1, not greater than about 0.095, not greater than about 0.09, not greater than about 0.085, not greater than about 0.08, not greater than about 0.075, not greater than about 0.07, not greater than about 0.065, not greater than about 0.06, not greater than about 0.055, not greater than about 0.05, not greater than about 0.045, not greater than about 0.04, not greater than about 0.035, not greater than about 0.03 or even not greater than about 0.020. It will be appreciated that the abrasive article may include a ratio $(H+X)/CS_D$ of any value between any of the maximum and minimum values noted above. It will be further appreciated that the abrasive article may include a ratio $(H+X)/CS_D$ of any value within a range between any numerical values between any of the maximum and minimum values noted above.

According to another particular embodiment, an abrasive article may include a particular ratio $(H+X)/CSc$, where H represents a prescribed height of the noise absorbing hole, X represents a prescribed depth of the noise absorbing hole and CSc represents the circumference of the circular substrate. For example, the abrasive article may include a ratio $(H+X)/CSc$ of at least about 0.003, such as, at least about 0.005, at least about 0.007, at least about 0.009, at least about 0.01, at least about 0.015, at least about 0.02, at least about 0.025, at least about 0.03, at least about 0.035, at least about 0.04, at least about 0.045, at least about 0.05, at least about 0.06, at least about 0.07, at least about 0.08, at least about 0.09 or even at least about 0.1. According to still another embodiment, the abrasive article may include a ratio of (H+X)/CSc of not greater than about 0.2, such as, not greater than about 0.15, not greater than about 0.1, not greater than about 0.095, not greater than about 0.09, not greater than about 0.085, not greater than about 0.08, not greater than about 0.075, not greater than about 0.07, not greater than about 0.065, not greater than about 0.06, not greater than about 0.055, not greater than about 0.05, not greater than about 0.045, not greater than about 0.04, not greater than about 0.035, not greater than about 0.03 or even not greater than about 0.025. It will be appreciated that the abrasive article may include a ratio (H+X)/CSc of any value between any of the maximum and minimum values noted above. It will be further appreciated that the abrasive article may include a ratio (H+X)/CSc of any value within a range between any numerical values between any of the maximum and minimum values noted above.

According to another particular embodiment, an abrasive article may include a particular ratio $H/CS_D$, where H represents a prescribed height of the noise absorbing hole and $CS_D$ represents a diameter of the circular substrate of the abrasive article. For example, the abrasive article may include a ratio $H/CS_D$ of at least about 0.005, such as, at least about 001, at least about 0.015, at least about 0.02, at least about 0.025, at least about 0.03, at least about 0.035, at least about 0.04, at least about 0.045, at least about 0.05, at least about 0.075 or even at least about 0.1. According to still another embodiment, the abrasive article may include a ratio of $H/CS_D$ of not greater than about 0.2, such as, not greater than about 0.15, not greater than about 0.1, not greater than about 0.095, not greater than about 0.09, not greater than about 0.085, not greater than about 0.08, not greater than about 0.075, not greater than about 0.07, not greater than about 0.065, not greater than about 0.06, not greater than about 0.055, not greater than about 0.05, not greater than about 0.045, not greater than about 0.04, not greater than about 0.035, not greater than about 0.03 or even not greater than about 0.025. It will be appreciated that the abrasive article may include a ratio $H/CS_D$ of any value between any of the maximum and minimum values noted above. It will be further appreciated that the abrasive article may include a ratio $H/CS_D$ of any value within a range between any numerical values between any of the maximum and minimum values noted above.

According to another particular embodiment, an abrasive article may include a particular ratio $X/CS_D$, where X represents a prescribed depth of the noise absorbing hole and $CS_D$ represents a diameter of the circular substrate of the abrasive article. For example, the abrasive article may include a ratio $X/CS_D$ of at least about 0.005, such as, at least about 0.01, at least about 0.015, at least about 0.02, at least about 0.025, at least about 0.03, at least about 0.035, at least about 0.04, at least about 0.045, at least about 0.05, at least about 0.06, at least about 0.07, at least about 0.08, at least about 0.09 or even at least about 0.1. According to still another embodiment, the abrasive article may include a ratio of $X/CS_D$ of not greater than about 0.2, such as, not greater than about 0.15, not greater than about 0.1, not greater than about 0.095, not greater than about 0.09, not greater than about 0.085, not greater than about 0.08, not greater than about 0.075, not greater than about 0.07, not greater than about 0.065, not greater than about 0.06, not greater than about 0.055, not greater than about 0.05, not greater than about 0.045, not greater than about 0.04, not greater than about 0.035, not greater than about 0.03 or even not greater than about 0.025. It will be appreciated that the abrasive article may include a ratio $X/CS_D$ of any value between any of the maximum and minimum values noted above. It will be further appreciated that the abrasive article may include a ratio $X/CS_D$ of any value within a range between any numerical values between any of the maximum and minimum values noted above.

According to another particular embodiment, an abrasive article may include a particular ratio $FL/CS_D$, where FL represents a prescribed full length of the center slot and $CS_D$ represents a diameter of the circular substrate of the abrasive article. For example, the abrasive article may include a ratio $FL/CS_D$ of at least about 0.0075, such as, at least about 0.01, at least about 0.015, at least about 0.02, at least about 0.025, at least about 0.03, at least about 0.035, at least about 0.04, at least about 0.045, at least about 0.05, at least about 0.06, at least about 0.07, at least about 0.08, at least about 0.09 or even at least about 0.1. According to still another embodiment, the abrasive article may include a ratio of $FL/CS_D$ of not greater than about 0.2, such as, not greater than about 0.15, not greater than about 0.1, not greater than about 0.095, not greater than about 0.09, not greater than about 0.085, not greater than about 0.08, not greater than about 0.075, not greater than about 0.07, not greater than about 0.065, not greater than about 0.06, not greater than about 0.055, not greater than about 0.05, not greater than about 0.045, not greater than about 0.04, not greater than about 0.035, not greater than about 0.03 or even not greater than about 0.025. It will be appreciated that the abrasive article may include a ratio $FL/CS_D$ of any value between any of the maximum and minimum values noted above. It will be further appreciated that the abrasive article may include a ratio $FL/CS_D$ of any value within a range between any numerical values between any of the maximum and minimum values noted above.

According to another particular embodiment, an abrasive article may include a particular ratio $H/CS_c$, where H represents a prescribed height of the noise absorbing hole and $CS_c$ represents a circumference of the circular substrate of the abrasive article. For example, the abrasive article may include a ratio $H/CS_c$ of at least about 0.0015, such as, at least about 002, at least about 0.003, at least about 0.004, at least about 0.005, at least about 0.006, at least about 0.007, at least about 0.008, at least about 0.009, at least about 0.01, at least about 0.015, at least about 0.02, at least about 0.025, at least about 0.03, at least about 0.035, at least about 0.04, at least about 0.045, at least about 0.05, at least about 0.06, at least about 0.07, at least about 0.08, at least about 0.09 or even at least about 0.1. According to still another embodiment, the abrasive article may include a ratio of $H/CS_c$ of not greater than about 0.2, such as, not greater than about 0.15, not greater than about 0.1, not greater than about 0.095, not greater than about 0.09, not greater than about 0.085, not greater than about 0.08, not greater than about 0.075, not greater than about 0.07, not greater than about 0.065, not greater than about 0.06, not greater than about 0.055, not greater than about 0.05, not greater than about 0.045, not greater than about 0.04, not greater than about 0.035, not greater than about 0.03 or even not greater than about 0.025. It will be appreciated that the abrasive article may include a ratio $H/CS_c$ of any value between any of the maximum and minimum values noted above. It will be further appreciated that the abrasive article may include a ratio $H/CS_c$ of any value within a range between any numerical values between any of the maximum and minimum values noted above.

According to another particular embodiment, an abrasive article may include a particular ratio $X/CS_c$, where X represents a prescribed depth of the noise absorbing hole and $CS_c$ represents a circumference of the circular substrate of the abrasive article. For example, the abrasive article may include a ratio $X/CS_c$ of at least about 0.0015, such as, at least about 0.003, at least about 0.005, at least about 0.01, at least about 0.015, at least about 0.02, at least about 0.025, at least about 0.03, at least about 0.035, at least about 0.04, at least about 0.045, at least about 0.05, at least about 0.06, at least about 0.07, at least about 0.08, at least about 0.09 or even at least about 0.1. According to still another embodiment, the abrasive article may include a ratio of $H/CS_c$ of not greater than about not greater than about 0.2, such as, not greater than about 0.15, not greater than about 0.1, not greater than about 0.095, not greater than about 0.09, not greater than about 0.085, not greater than about 0.08, not greater than about 0.075, not greater than about 0.07, not greater than about 0.065, not greater than about 0.06, not greater than about 0.055, not greater than about 0.05, not greater than about 0.045, not greater than about 0.04, not greater than about 0.035, not greater than about 0.03 and not greater than about 0.025. It will be appreciated that the abrasive article may include a ratio $X/CS_c$ of any value between any of the maximum and minimum values noted above. It will be further appreciated that the abrasive article may include a ratio $X/CS_c$ of any value within a range between any numerical values between any of the maximum and minimum values noted above.

According to another particular embodiment, an abrasive article may include a particular ratio $FL/CS_c$, where FL represents a prescribed full length of the center slot and $CS_c$ represents a circumference of the circular substrate of the abrasive article. For example, the abrasive article may include a ratio $FL/CS_c$ of at least about 0.002, such as, at least about 0.003, at least about 0.004, at least about 0.005, at least about 0.006, at least about 0.007, at least about 0.008, at least about 0.009, at least about 0.01, at least about 0.015, at least about 0.02, at least about 0.025, at least about 0.03, at least about 0.035, at least about 0.04, at least about 0.045, at least about 0.05, at least about 0.06, at least about 0.07, at least about 0.08, at least about 0.09 or even at least about 0.1. According to still another embodiment, the abrasive article may include a ratio of $FL/CS_c$ of not greater than about 0.2, such as, not greater than about 0.15, not greater than about 0.1, not greater than about 0.095, not greater than about 0.09, not greater than about 0.085, not greater than about 0.08, not greater than about 0.075, not greater than about 0.07, not greater than about 0.065, not greater than about 0.06, not greater than about 0.055, not greater than about 0.05, not greater than about 0.045, not greater than about 0.04, not greater than about 0.035, not greater than about 0.03 or even not greater than about 0.025. It will be appreciated that the abrasive article may include a ratio $FL/CS_c$ of any value between any of the maximum and minimum values noted above. It will be further appreciated that the abrasive article may include a ratio $FL/CS_c$ of any value within a range between any numerical values between any of the maximum and minimum values noted above.

According to another particular embodiment, the abrasive article may include a center slot oriented at particular angle (α). For example, the abrasive article may include a center slot oriented at an angle (α) of at least about 5 degrees, such as, at least about 10 degrees, at least about 15 degrees, at least about 20 degrees, at least about 25 degrees, at least about 30 degrees, at least about 35 degrees, at least about 40 degrees, at least about 45 degrees, at least about 50 degrees, at least about 55 degrees, at least about 60 degrees, at least about 65 degrees, at least about 70 degrees, at least about 75 degrees, at least about 80 degrees or even at least about 85 degrees. According to still another embodiment, the abrasive article may include a center slot oriented at an angle (α) of not greater than about 89 degrees, such as, not greater than about 85 degrees, not greater than about 80 degrees, not greater than about 75 degrees, not greater than about 70 degrees, not greater than about 65 degrees, not greater than about 60 degrees, not greater than about 55 degrees, not greater than about 50 degrees, not greater than about 45 degrees, not greater than about 40 degrees, not greater than about 35 degrees, not greater than about 30 degrees, not greater than about 25 degrees, not greater than about 20 degrees, not greater than about 15 degrees or even not greater than about 10 degrees. It will be appreciated that the abrasive article may include a center slot oriented at an angle (α) of any value between any of the maximum and minimum values noted above. It will be further appreciated that the abrasive article may include a center slot oriented at an angle (α) of any value within a range between any numerical values between any of the maximum and minimum values noted above.

According to another particular embodiment, the abrasive article may include a value (H+X), where H represents a prescribed height of the noise absorbing hole and X represents a prescribed depth of the noise absorbing hole. For example, the abrasive article may include a value (H+X) of at least about 10 mm, such as, at least about 12 mm, at least about 15 mm, at least about 20 mm, at least about 25 mm, at least about 30 mm, at least about 35 mm, at least about 40 mm, at least about 45 mm, at least about 50 mm, at least about 100 mm, at least about 200 mm, at least about 300 mm or even at least about 400 mm. According to another particular embodiment, the abrasive article may include a value (H+X) of not greater than about 500 mm, such as, not greater than about 400 mm, not greater than about 300 mm, not greater than about 200 mm, not greater than about 100 mm, not greater than about 50 mm, not greater than about 45 mm, not greater than about 40 mm, not greater than about 35 mm, not greater than about 30 mm, not greater than about 25 mm, not greater than about 20 mm or even not greater than about 15 mm. It will be appreciated that the abrasive article may include a value (H+X) of any value between any of the maximum and minimum values noted above. It will be further appreciated that the abrasive article may include a value (H+X) of any value within a range between any numerical values between any of the maximum and minimum values noted above.

According to yet another embodiment, the abrasive article may include a particular height (H) of the noise absorbing hole. For example, the abrasive article may include a height (H) of at least about 5 mm, such as, at least about 10 mm, at least about 15 mm, at least about 20 mm, at least about 25 mm, at least about 30 mm, at least about 35 mm, at least about 40 mm, at least about 45 mm, at least about 50 mm, at least about 100 mm, at least about 200 mm, at least about 300 mm or even at least about 400 mm. According to still another embodiment, the abrasive article may include a height (H) of not greater than about 500 mm, such as, not greater than about 400 mm, not greater than about 300 mm, not greater than about 200 mm, not greater than about 100 mm, not greater than about 50 mm, not greater than about 45 mm, not greater than about 40 mm, not greater than about 35 mm, not greater than about 30 mm, not greater than about 25 mm, not greater than about 20 mm or even not greater than about 15 mm. It will be appreciated that the abrasive article may include a height (H) of any value between any of the maximum and minimum values noted above. It will be further appreciated that the abrasive article may include a height (H) of any value within a range between any numerical values between any of the maximum and minimum values noted above.

According to yet another embodiment, the abrasive article may include a particular depth (X) of the noise absorbing hole. For example, the abrasive article may include a depth (X) of at least about 10 mm, such as, at least about 15 mm, at least about 20 mm, at least about 25 mm, at least about 30 mm, at least about 35 mm, at least about 40 mm, at least about 45 mm, at least about 50 mm, at least about 100 mm, at least about 200 mm, at least about 300 mm or even at least about 400 mm. According to still another embodiment, the abrasive article may include a depth (X) of not greater than about 500 mm, not greater than about 400 mm, not greater than about 300 mm, not greater than about 200 mm, not greater than about 100 mm, not greater than about 50 mm, not greater than about 45 mm, not greater than about 40 mm, not greater than about 35 mm, not greater than about 30 mm, not greater than about 25 mm, not greater than about 20 mm or even not greater than about 15 mm. It will be appreciated that the abrasive article may include a depth (X) of any value between any of the maximum and minimum values noted above. It will be further appreciated that the abrasive article may include a depth (X) of any value within a range between any numerical values between any of the maximum and minimum values noted above.

According to yet another embodiment, the abrasive article may include a particular full length (FL) of the center slot. For example, the abrasive article may include a full length (FL) of at least about 7.5, such as, at least about 10 mm, at least about 15 mm, at least about 20 mm, at least about 25 mm, at least about 30 mm, at least about 35 mm, at least about 40 mm, at least about 45 mm, at least about 50 mm, at least about 100 mm, at least about 200 mm, at least about 300 mm or even at least about 400 mm. According to still another embodiment, the abrasive article may include a full length (FL) of not greater than about 500 mm, not greater than about 400 mm, not greater than about 300 mm, not greater than about 200 mm, not greater than about 100 mm, not greater than about 50 mm, not greater than about 45 mm, not greater than about 40 mm, not greater than about 35 mm, not greater than about 30 mm, not greater than about 25 mm, not greater than about 20 mm or even not greater than about 15 mm. It will be appreciated that the abrasive article may include a full depth (FL) of any value between any of the maximum and minimum values noted above. It will be further appreciated that the abrasive article may include a full length (FL) of any value within a range between any numerical values between any of the maximum and minimum values noted above.

According to still another embodiment, the abrasive article may include a circular substrate having a particular diameter. For example, the circular substrate may have a diameter of at least about 100 mm, such as, at least about 200 mm, at least about 300 mm, at least about 400 mm, at least about 500 mm, at least about 600 mm, at least about 700 mm, at least about 800 mm or even at least about 900. According to still another embodiment, the circular substrate may have a diameter of not greater than about 1000 mm, such as, not greater than about 900 mm, not greater than about 800 mm, not greater than about 700 mm, not greater than about 600 mm, not greater than about 500 mm, not greater than about 400 mm, not greater than about 300 mm or even not greater than about 200 mm. It will be appreciated that the circular substrate may have a diameter of any value between any of the maximum and minimum values noted above. It will be further appreciated that the circular substrate may have a diameter of any value within a range between any numerical values between any of the maximum and minimum values noted above.

According to still another embodiment, the abrasive article may include a circular substrate having a particular circumference. For example, the circular substrate may have a circumference of at least about 500 mm, such as, at least about 1000 mm, at least about 1500 mm, at least about 2000 mm, at least about 2500 mm, at least about 3000 mm, at least about 3500 mm, at least about 4000 mm or even at least about 4500 mm. According to still another embodiment, the circular substrate may have a circumference of not greater than about 5000 mm, such as, not greater than about 4500 mm, not greater than about 4000 mm, not greater than about 3500 mm, not greater than about 3000 mm, not greater than about 2500 mm, not greater than about 2000 mm, not greater than about 1500 mm or even not greater than about 1000 mm. It will be appreciated that the circular substrate may have a circumference of any value between any of the maximum and minimum values noted above. It will be further appreciated that the circular substrate may have a circumference of any value within a range between any numerical values between any of the maximum and minimum values noted above.

Many different aspects and embodiments are possible. Some of these aspects and embodiments are described below. After reading this specification, those skilled in the art will appreciate that these aspects and embodiments are only illustrative and do not limit the scope of the present invention. Embodiments may be in accordance with any one or more of the items as listed below.

Item 1. An abrasive article comprising a circular substrate, a plurality of segments arranged on the circumferential surface of the circular substrate, an outlet slot defining an open space on a peripheral portion of the abrasive article between a first segment and a second segment, a center slot defining an open space in the circular substrate connected to the outlet slot, a noise absorbing hole connected to the center slot and protruding from the center slot in the rotating direction of the abrasive article, and a ratio (H+X)/CSD of at least about 0.01, wherein H is equal to a prescribed height of the noise absorbing hole, X is equal to a prescribed depth of the noise absorbing hole and CSD is equal to the diameter of the circular substrate.

Item 2. An abrasive article comprising a circular substrate, a plurality of segments arranged on the circumferential surface of the circular substrate, an outlet slot defining an open space on a peripheral portion of the abrasive article between a first segment and a second segment, a center slot defining an open space in the circular substrate connected to the outlet slot, a noise absorbing hole connected to the center slot and protruding from the center slot in the rotating direction of the abrasive article and a ratio (H+X)/CSc of at least about 0.003, wherein H is equal to a prescribed height of the noise absorbing hole, X is equal to a prescribed depth of the noise absorbing hole and CSc is equal to the circumference of the circular substrate.

Item 3. An abrasive article comprising a circular substrate, a plurality of segments arranged on the circumferential surface of the circular substrate, an outlet slot defining an open space on a peripheral portion of the abrasive article between a first segment and a second segment, a center slot defining an open space in the circular substrate connected to the outlet slot, a noise absorbing hole connected to the center slot and protruding from the center slot in the rotating direction of the abrasive article; and at least one of a ratio H/CSD of at least about 0.005, wherein H is equal to a prescribed height of the noise absorbing hole and CSD is equal to the diameter of the circular substrate, a ratio X/CSD of at least about 0.005, wherein X is equal to a prescribed depth of the noise absorbing hole and CSD is equal to the diameter of the circular substrate, and a ratio FL/CSD of at least about 0.0075, wherein FL is equal to a prescribed full length of the center slot and the noise absorbing hole and CSD is equal to the diameter of the circular substrate.

Item 4. An abrasive article comprising a circular substrate, a plurality of segments arranged on the circumferential surface of the circular substrate, an outlet slot defining an open space on a peripheral portion of the abrasive article between a first segment and a second segment, a center slot defining an open space in the circular substrate connected to the outlet slot, a noise absorbing hole connected to the center slot and protruding from the center slot in the rotating direction of the abrasive article; and at least one of a ratio H/CSC of at least about 0.0015, wherein H is equal to a prescribed height of the noise absorbing hole and CSC is equal to the circumference of the circular substrate, a ratio X/CSC of at least about 0.0015, wherein X is equal to a prescribed depth of the noise absorbing hole and CSc is equal to the circumference of the circular substrate, and a ratio FL/CSc of at least about 0.002, wherein FL is equal to a prescribed full length of the center slot and the noise absorbing hole and CSc is equal to the circumference of the circular substrate.

Item 5. The abrasive article of any one of the previous items, wherein the abrasive article further comprises a ratio (H+X)/CSD at least about 0.01, wherein H is equal to a prescribed height of the noise absorbing hole, X is equal to a prescribed depth of the noise absorbing hole and CSD is equal to the diameter of the circular substrate, at least about 0.02, at least about 0.03, at least about 0.035, at least about 0.04, at least about 0.045, at least about 0.05, at least about 0.055, at least about 0.06, at least about 0.065, at least about 0.07, at least about 0.075, at least about 0.08, at least about 0.085, at least about 0.09, at least about 0.095 and at least about 0.1.

Item 6. The abrasive article of any one of the previous items, wherein the abrasive article further comprises a ratio (H+X)/CSD not greater than about 0.2, wherein H is equal to a prescribed height of the noise absorbing hole, X is equal to a prescribed depth of the noise absorbing hole and CSD is equal to the diameter of the circular substrate, not greater than about 0.15, not greater than about 0.1, not greater than about 0.095, not greater than about 0.09, not greater than about 0.085, not greater than about 0.08, not greater than about 0.075, not greater than about 0.07, not greater than about 0.065, not greater than about 0.06, not greater than about 0.055, not greater than about 0.05, not greater than about 0.045, not greater than about 0.04, not greater than about 0.035, not greater than about 0.03 and not greater than about 0.020.

Item 7. The abrasive article of any one of the previous items, wherein the abrasive article further comprises a ratio (H+X)/CSc at least about 0.003, wherein H is equal to a prescribed height of the noise absorbing hole, X is equal to a prescribed depth of the noise absorbing hole and CSc is equal to the circumference of the circular substrate, at least about 0.005, at least about 0.007, at least about 0.009, at least about 0.01, at least about 0.015, at least about 0.02, at least about 0.025, at least about 0.03, at least about 0.035, at least about 0.04, at least about 0.045, at least about 0.05, at least about 0.06, at least about 0.07, at least about 0.08, at least about 0.09 and at least about 0.1.

Item 8. The abrasive article of any one of the previous items, wherein the abrasive article further comprises a ratio (H+X)/CSc¬ not greater than about 0.2, wherein H is equal to a prescribed height of the noise absorbing hole, X is equal to a prescribed depth of the noise absorbing hole and CSc is equal to the circumference of the circular substrate, not greater than about 0.15, not greater than about 0.1, not greater than about 0.095, not greater than about 0.09, not greater than about 0.085, not greater than about 0.08, not greater than about 0.075, not greater than about 0.07, not greater than about 0.065, not greater than about 0.06, not greater than about 0.055, not greater than about 0.05, not greater than about 0.045, not greater than about 0.04, not greater than about 0.035, not greater than about 0.03 and not greater than about 0.025.

Item 9. The abrasive article of any one of the previous items, wherein the abrasive article further comprises a ratio H/CSD at least about 0.005, wherein H is equal to a prescribed height of the noise absorbing hole and CSD is equal to the diameter of the circular substrate, at least about 001, at least about 0.015, at least about 0.02, at least about 0.025, at least about 0.03, at least about 0.035, at least about 0.04, at least about 0.045, at least about 0.05, at least about 0.075 and at least about 0.1.

Item 10. The abrasive article of any one of the previous items, wherein the abrasive article further comprises a ratio H/CSD of not greater than about 0.2, wherein H is equal to a prescribed height of the noise absorbing hole and CSD is equal to the diameter of the circular substrate, not greater than about 0.15, not greater than about 0.1, not greater than about 0.095, not greater than about 0.09, not greater than about 0.085, not greater than about 0.08, not greater than about 0.075, not greater than about 0.07, not greater than about 0.065, not greater than about 0.06, not greater than about 0.055, not greater than about 0.05, not greater than about 0.045, not greater than about 0.04, not greater than about 0.035, not greater than about 0.03 and not greater than about 0.025.

Item 11. The abrasive article of any one of the previous items, wherein the abrasive article further comprises a ratio X/CSD of at least about 0.01, wherein X is equal to a prescribed depth of the noise absorbing hole and CSD is equal to the diameter of the circular substrate, at least about 0.015, at least about 0.02, at least about 0.025, at least about 0.03, at least about 0.035, at least about 0.04, at least about 0.045, at least about 0.05, at least about 0.06, at least about 0.07, at least about 0.08, at least about 0.09 and at least about 0.1.

Item 12. The abrasive article of any one of the previous items, wherein the abrasive article further comprises a ratio X/CSD of not greater than about 0.2, wherein X is equal to a prescribed depth of the noise absorbing hole and CSD is equal to the diameter of the circular substrate, not greater than about 0.15, not greater than about 0.1, not greater than about 0.095, not greater than about 0.09, not greater than about 0.085, not greater than about 0.08, not greater than about 0.075, not greater than about 0.07, not greater than about 0.065, not greater than about 0.06, not greater than about 0.055, not greater than about 0.05, not greater than about 0.045, not greater than about 0.04, not greater than about 0.035, not greater than about 0.03 and not greater than about 0.025.

Item 13. The abrasive article of any one of the previous items, wherein the abrasive article further comprises a ratio FL/CSD of at least about 0.0075, wherein FL is equal to a prescribed full length of the center slot and the noise absorbing hole and CSD is equal to the diameter of the circular substrate, at least about 0.01, at least about 0.015, at least about 0.02, at least about 0.025, at least about 0.03, at least about 0.035, at least about 0.04, at least about 0.045, at least about 0.05, at least about 0.06, at least about 0.07, at least about 0.08, at least about 0.09 and at least about 0.1.

Item 14. The abrasive article of any one of the previous items, wherein the abrasive article further comprises a ratio FL/CSD of not greater than about 0.2, wherein FL is equal to a prescribed full length of the center slot and the noise absorbing hole and CSD is equal to the diameter of the circular substrate, not greater than about 0.15, not greater than about 0.1, not greater than about 0.095, not greater than about 0.09, not greater than about 0.085, not greater than about 0.08, not greater than about 0.075, not greater than about 0.07, not greater than about 0.065, not greater than about 0.06, not greater than about 0.055, not greater than about 0.05, not greater than about 0.045, not greater than about 0.04, not greater than about 0.035, not greater than about 0.03 and not greater than about 0.025.

Item 15. The abrasive article of any one of the previous items, wherein the abrasive article further comprises a ratio H/CSC of at least about 0.0015, wherein H is equal to a prescribed height of the noise absorbing hole and CSC is equal to the circumference of the circular substrate, at least about 002, at least about 0.003, at least about 0.004, at least about 0.005, at least about 0.006, at least about 0.007, at least about 0.008, at least about 0.009, at least about 0.01, at least about 0.015, at least about 0.02, at least about 0.025, at least about 0.03, at least about 0.035, at least about 0.04, at least about 0.045, at least about 0.05, at least about 0.06, at least about 0.07, at least about 0.08, at least about 0.09 and at least about 0.1.

Item 16. The abrasive article of any one of the previous items, wherein the abrasive article further comprises a ratio H/CSC of not greater than 0.2, wherein H is equal to a prescribed height of the noise absorbing hole and CSC is equal to the circumference of the circular substrate, not greater than about 0.15, not greater than about 0.1, not greater than about 0.095, not greater than about 0.09, not greater than about 0.085, not greater than about 0.08, not greater than about 0.075, not greater than about 0.07, not greater than about 0.065, not greater than about 0.06, not greater than about 0.055, not greater than about 0.05, not greater than about 0.045, not greater than about 0.04, not greater than about 0.035, not greater than about 0.03 and not greater than about 0.025.

Item 17. The abrasive article of any one of the previous items, wherein the abrasive article further comprises a ratio X/CSC of at least about 0.003, wherein X is equal to a prescribed depth of the noise absorbing hole and CSc is equal to the circumference of the circular substrate, at least about 0.005, at least about 0.01, at least about 0.015, at least about 0.02, at least about 0.025, at least about 0.03, at least about 0.035, at least about 0.04, at least about 0.045, at least about 0.05, at least about 0.06, at least about 0.07, at least about 0.08, at least about 0.09 and at least about 0.1.

Item 18. The abrasive article of any one of the previous items, wherein the abrasive article further comprises a ratio X/CSC of not greater than about 0.2, wherein X is equal to a prescribed depth of the noise absorbing hole and CSc is equal to the circumference of the circular substrate not greater than about 0.15, not greater than about 0.1, not greater than about 0.095, not greater than about 0.09, not greater than about 0.085, not greater than about 0.08, not greater than about 0.075, not greater than about 0.07, not greater than about 0.065, not greater than about 0.06, not greater than about 0.055, not greater than about 0.05, not greater than about 0.045, not greater than about 0.04, not greater than about 0.035, not greater than about 0.03 and not greater than about 0.025.

Item 19. The abrasive article of any one of the previous items, wherein the abrasive article further comprises a ratio FL/CSC of at least about 0.002, wherein FL is equal to a prescribed full length of the center slot and the noise absorbing hole and CSc is equal to the circumference of the circular substrate, at least about 0.003, at least about 0.004, at least about 0.005, at least about 0.006, at least about 0.007, at least about 0.008, at least about 0.009, at least about 0.01, at least about 0.015, at least about 0.02, at least about 0.025, at least about 0.03, at least about 0.035, at least about 0.04, at least about 0.045, at least about 0.05, at least about 0.06, at least about 0.07, at least about 0.08, at least about 0.09 and at least about 0.1.

Item 20. The abrasive article of any one of the previous items, wherein the abrasive article further comprises a ratio FL/CSC of not greater than about 0.2, wherein FL is equal to a prescribed full length of the center slot and the noise absorbing hole and CSc is equal to the circumference of the circular substrate, not greater than about 0.15, not greater than about 0.1, not greater than about 0.095, not greater than about 0.09, not greater than about 0.085, not greater than about 0.08, not greater than about 0.075, not greater than about 0.07, not greater than about 0.065, not greater than about 0.06, not greater than about 0.055, not greater than about 0.05, not greater than about 0.045, not greater than about 0.04, not greater than about 0.035, not greater than about 0.03 and not greater than about 0.025.

Item 21. The abrasive article of any one of the previous items, wherein the abrasive article further comprises an angle (α) of at least about 5 degrees, at least about 10 degrees, at least about 15 degrees, at least about 20 degrees, at least about 25 degrees, at least about 30 degrees, at least about 35 degrees, at least about 40 degrees, at least about 45 degrees, at least about 50 degrees, at least about 55 degrees, at least about 60 degrees, at least about 65 degrees, at least about 70 degrees, at least about 75 degrees, at least about 80 degrees and at least about 85 degrees.

Item 22. The abrasive article of any one of the previous items, wherein the abrasive article further comprises an angle (α) of not greater than about 89 degrees, not greater than about 85 degrees, not greater than about 80 degrees, not greater than about 75 degrees, not greater than about 70 degrees, not greater than about 65 degrees, not greater than about 60 degrees, not greater than about 55 degrees, not greater than about 50 degrees, not greater than about 45 degrees, not greater than about 40 degrees, not greater than about 35 degrees, not greater than about 30 degrees, not greater than about 25 degrees, not greater than about 20 degrees, not greater than about 15 degrees and not greater than about 10 degrees.

Item 23. The abrasive article of any one of the previous items, wherein the abrasive article further comprises a value (H+X) of at least about 12 mm, wherein H is equal to a prescribed height of the noise absorbing hole and X is equal to a prescribed depth of the noise absorbing hole, at least about 15 mm, at least about 20 mm, at least about 25 mm, at least about 30 mm, at least about 35 mm, at least about 40 mm, at least about 45 mm, at least about 50 mm, at least about 100 mm, at least about 200 mm, at least about 300 mm, at least about 400 mm.

Item 24. The abrasive article of any one of the previous items, wherein the abrasive article further comprises a value (H+X) of not greater than about 500 mm, wherein H is equal to a prescribed height of the noise absorbing hole and X is equal to a prescribed depth of the noise absorbing hole, not greater than about 400 mm, not greater than about 300 mm, not greater than about 200 mm, not greater than about 100 mm, not greater than about 50 mm, not greater than about 45 mm, not greater than about 40 mm, not greater than about 35 mm, not greater than about 30 mm, not greater than about 25 mm, not greater than about 20 mm, and not greater than about 15 mm.

Item 25. The abrasive article of any one of the previous items, wherein the abrasive article further comprises a height (H) of at least about 5 mm, wherein H is equal to a prescribed height of the noise absorbing hole, at least about 10 mm, at least about 15 mm, at least about 20 mm, at least about 25 mm, at least about 30 mm, at least about 35 mm, at least about 40 mm, at least about 45 mm, at least about 50 mm, at least about 100 mm, at least about 200 mm, at least about 300 mm, at least about 400 mm.

Item 26. The abrasive article of any one of the previous items, wherein the abrasive article further comprises a height (H) of not greater than about 500 mm, wherein H is equal to a prescribed height of the noise absorbing hole, not greater than about 400 mm, not greater than about 300 mm, not greater than about 200 mm, not greater than about 100 mm, not greater than about 50 mm, not greater than about 45 mm, not greater than about 40 mm, not greater than about 35 mm, not greater than about 30 mm, not greater than about 25 mm, not greater than about 20 mm and not greater than about 15 mm.

Item 27. The abrasive article of any one of the previous items, wherein the abrasive article further comprises a depth (X) of at least about 10 mm, wherein X is equal to a prescribed depth of the noise absorbing hole, at least about 15 mm, at least about 20 mm, at least about 25 mm, at least about 30 mm, at least about 35 mm, at least about 40 mm, at least about 45 mm, at least about 50 mm, at least about 100 mm, at least about 200 mm, at least about 300 mm and at least about 400 mm.

Item 28. The abrasive article of any one of the previous items, wherein the abrasive article further comprises a depth (X) of not greater than about 500 mm, wherein X is equal to a prescribed depth of the noise absorbing hole, not greater than about 400 mm, not greater than about 300 mm, not greater than about 200 mm, not greater than about 100 mm, not greater than about 50 mm, not greater than about 45 mm, not greater than about 40 mm, not greater than about 35 mm, not greater than about 30 mm, not greater than about 25 mm, not greater than about 20 mm and not greater than about 15 mm.

Item 29. The abrasive article of any one of the previous items, wherein the abrasive article further comprises a full length FL of at least about 7.5, wherein FL is equal to a prescribed full length of the center slot and the noise absorbing hole, at least about 10 mm, wherein X is equal to a prescribed depth of the noise absorbing hole, at least about 15 mm, at least about 20 mm, at least about 25 mm, at least about 30 mm, at least about 35 mm, at least about 40 mm, at least about 45 mm, at least about 50 mm, at least about 100 mm, at least about 200 mm, at least about 300 mm and at least about 400 mm.

Item 30. The abrasive article of any one of the previous items, wherein the abrasive article further comprises a full length FL of not greater than about 500 mm, wherein FL is equal to a prescribed full length of the center slot and the noise absorbing hole, not greater than about 400 mm, not greater than about 300 mm, not greater than about 200 mm, not greater than about 100 mm, not greater than about 50 mm, not greater than about 45 mm, not greater than about 40 mm, not greater than about 35 mm, not greater than about 30 mm, not greater than about 25 mm, not greater than about 20 mm and not greater than about 15 mm.

Item 31. The abrasive article of any one of the previous items, wherein the circular substrate comprises a diameter of at least about 100 mm, at least about 200 mm, at least about 300 mm, at least about 400 mm, at least about 500 mm, at least about 600 mm, at least about 700 mm, at least about 800 mm and at least about 900.

Item 32. The abrasive article of any one of the previous items, wherein the circular substrate comprises a diameter of not greater than about 1000 mm, not greater than about 900 mm, not greater than about 800 mm, not greater than about 700 mm, not greater than about 600 mm, not greater than about 500 mm, not greater than about 400 mm, not greater than about 300 mm and not greater than about 200 mm.

Item 33. The abrasive article of any one of the previous items, wherein the circular substrate comprises a circumference of at least about 500 mm, at least about 1000 mm, at least about 1500 mm, at least about 2000 mm, at least about 2500 mm, at least about 3000 mm, at least about 3500 mm, at least about 4000 mm and at least about 4500 mm.

Item 34. The abrasive article of any one of the previous items, wherein the circular substrate comprises a circumference of not greater than about 5000 mm, and not greater than about 4500 mm, and not greater than about 4000 mm, and not greater than about 3500 mm, and not greater than about 3000 mm, and not greater than about 2500 mm, and not greater than about 2000 mm, and not greater than about 1500 mm, and not greater than about 1000 mm.

Item 35. A abrasive article, wherein a plurality of segment chips are arranged on the circumferential surface of a circular substrate, and an outlet slot is formed on the outer peripheral portion of the circular substrate between segment chips, the abrasive article comprising a center slot connected to the outlet slot, formed on the circular substrate at a prescribed angle relative to the radial direction of the circular substrate and having a prescribed width, and a noise-absorbing hole connected to the center slot, protruding from the center slot for a prescribed depth in the rotating direction of the abrasive article, and having a prescribed height.

Item 36. The abrasive article according to item 35, wherein the prescribed depth is 10 mm or more without regard to the prescribed height and the prescribed angle.

Item 37. The abrasive article according to item 35, wherein the prescribed height is 5 mm or more and the prescribed depth is 5 mm or more.

Item 38. The abrasive article according to item 35, wherein each of the prescribed depth, the prescribed width and the prescribed height is 5 mm or more, and the prescribed angle is 5 degrees or more.

Item 39. The abrasive article according to item 35, wherein a full length from a common area for the center slot and the noise-absorbing hole to the end of the noise-absorbing hole is equal to or greater than a prescribed value.

Item 40. The abrasive article according to item 39, wherein the full length is 7.5 mm or more and the prescribed depth is greater than 2.5 mm.

EXAMPLES

Prior to conducting noise evaluation of abrasive articles formed according to embodiments described herein, a noise evaluation was conducted for two types of abrasive articles.

First, a so-called key slot type (K slot type) abrasive article that includes a circular hole provided at the tip end of slots in the abrasive article was evaluated for noise production. Second, a U slot type abrasive article that includes a U shape provided at the tip end of slots in the abrasive article was evaluated for noise production. For the U slot type abrasive articles, three prototypes were produced in which the slot angle was −10 degrees, 0 degrees (perpendicular) and +10 degrees. As shown in FIG. 3, the slot angle for the U type slots represents an inclination from the radial direction of the slot. For both the K slot type and the U slot type, other dimensions were set as follows: the outer diameter of the abrasive article, including the height (12 mm) of a segment chip, was 481 mm; the thickness of a circular substrate was 2.6 mm; and the width W of a slot was 6 mm. As to the measurement of noise, cooling water supply was stopped and the abrasive article was idled under conditions where the number of revolutions of an engine was 3000 rpm. A noise level meter was installed (normal sound level meter manufactured by RION Inc.; NL-22) at a position 1 meter away from the right hand side of a cutting device and then a noise level was measured for each frequency of noise. Furthermore, in order to measure background noise, noise in a condition where no abrasive article is mounted on a cutting device was measured.

Table 1 summarizes the results of the noise evaluation for the U-type slots at the provided angles. An "x" mark in the table indicates that noise (i.e., wind noise) was generated at high sound ranges and a "○" in the table indicates that the noise level is lower than an allowable value.

TABLE 1

| | α (degree) | | |
|---|---|---|---|
| | −10 | 0 | 10 |
| Noise Evaluation | x | x | x |

W = 6 mm

Figure 4A:
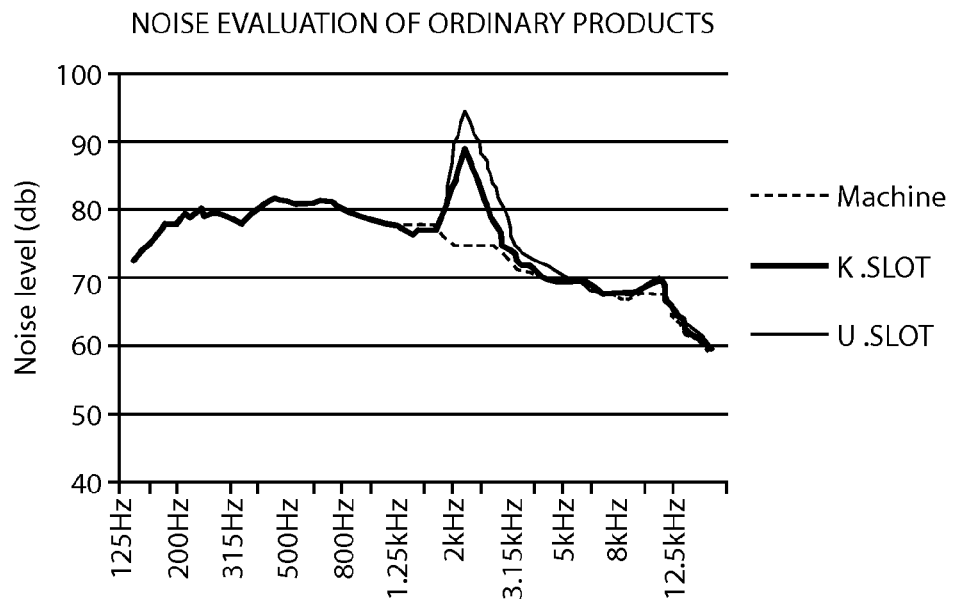
FIGS. 4(a)-(d) includes plots showing noise evaluation of a standard product versus noise evaluation of abrasive articles according to particular embodiments.

FIG. 4(a) shows the result of noise evaluation for a prototype of the key slot type abrasive article and a prototype of the U slot type abrasive article, where the X-axis and the Y-axis show the frequency of noise and the noise level, respectively. The noise shown by "Machine" represents background noise in conditions where no abrasive article was mounted on a cutting device. Accordingly, the actual noise levels of the K slot type abrasive article and the U slot type abrasive article show values found by subtracting the background noise shown by "Machine." In FIG. 4(a), peaking occurs at 2 KHz or thereabout for both the K slot type abrasive article and the U slot type abrasive article, which is the cause of wind noise. Table 1 and FIG. 4(a) show that all of a general-purpose key slot type abrasive article with an angle α of 0 degrees, a general-purpose U slot type abrasive article with an angle α of 0 degrees, and U slot type abrasive articles in which the slot is tilted by −10 degrees or +10 degrees generate wind noise.

A description of the noise evaluation of sample abrasive articles formed according to particular embodiments as described herein in reference to FIGS. 1 and 2 is given below. The height of the segment chip 12, the outer diameter, and the thickness of the circular substrate 11 of each abrasive article formed according to embodiments described herein and used for the noise evaluation shown in Table 2 below are the same as those of abrasive articles shown in Table 1. The width W and the angle α of the center slots 32 in the each abrasive article were 5 mm and 0 degrees, respectively. The relationship between the angle and the noise level of prototypes in which the depth X is 5 mm and the height H 5 mm is described below in detail by using Table 3.

As shown in Table 2, example abrasive articles were made in which the depth X of the noise-absorbing hole 33 was 2.5 mm, 5 mm or 10 mm and the height H of the noise-absorbing hole 33 was 2 mm, 3 mm, 5 mm and 10 mm. Table 2 summarizes the results of the noise evaluation for each of the example abrasive articles. Noise evaluation was conducted during idling of the example abrasive article according to the same procedure as was used for evaluating the K-Type and U-Type abrasive articles. An "x" mark in the table indicates that noise (i.e., wind noise) was generated at high sound ranges and a "○" in the table indicates that the noise level is lower than an allowable value.

TABLE 2

| | X (mm) | | |
|---|---|---|---|
| H (mm) | 2.5 | 5 | 10 |
| 2 | | | ○ |
| 3 | X | x | ○ |
| 5 | X | x | ○ |
| 10 | X | ○ | ○ |

W = 5 mm
α = 0 degrees

Table 2 shows that when the depth X of the noise-absorbing hole 33 is 10 mm, the noise (wind noise) level at high sound ranges becomes equal to or lower than an allowable value irrespective of the value of the height H of the noise-absorbing hole 33. The experimental result also show that when the height H is 10 mm and the depth X is changed from 2.5 mm to 5 mm to 10 mm, noise at high sound ranges is reduced as the depth X is increased and that the effect of suppressing noise continues when the depth X is further increased. Accordingly, when the height H is from 2 mm to 10 mm, noise at high sound ranges can be lowered to an allowable value or below if the depth X is made equal to or greater than 10 mm. The result also shows that the reduction of noise requires the depth X to be 5 mm or more under the abovementioned conditions. Furthermore, the comparison of noise levels when the depth X is 5 mm and the height H is 3 mm, 5 mm or 10 mm shows that the noise level is lowered as the height H is increased.

Figure 4B:
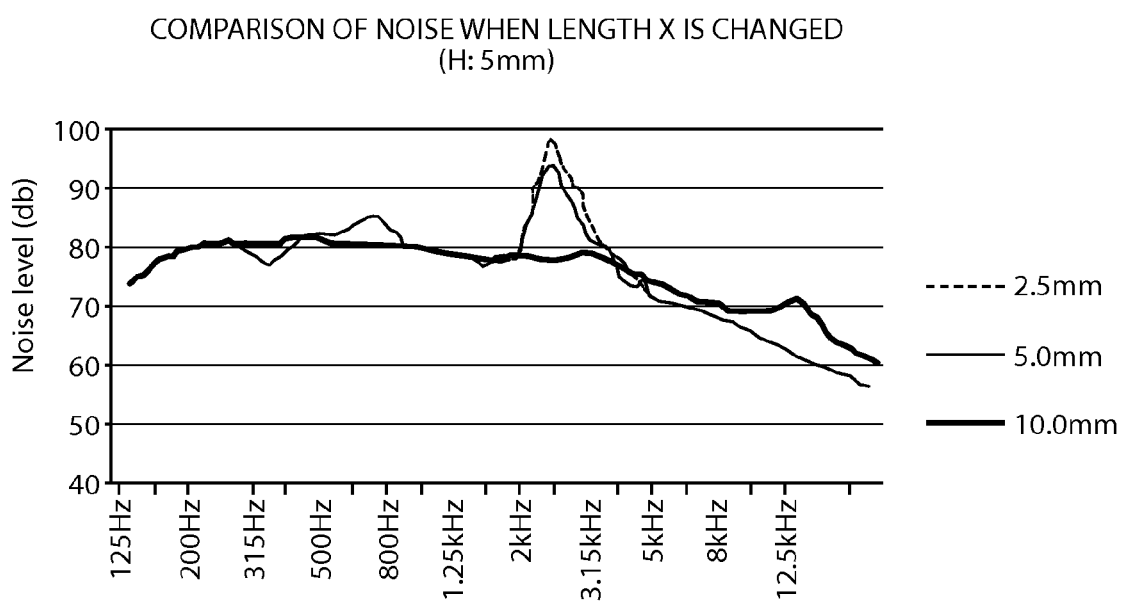
Figure 4C:
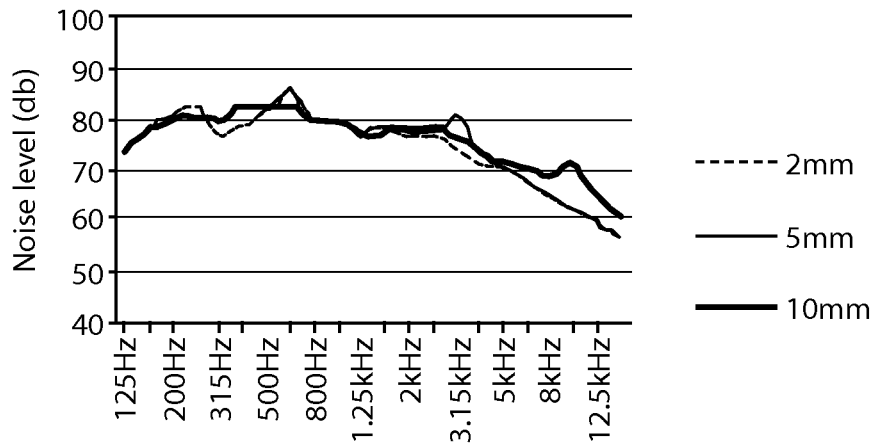

FIG. 4(b) is a graph evaluating the noise levels of example abrasive articles under the conditions surrounded by a bold frame in Table 2 (i.e., where the height H is 5 mm and the depth X is 2.5 mm, 5 mm and 10 mm). FIG. 4(c) is a graph evaluating the noise levels of prototypes where the depth X is 10 mm and the height H is 2 mm, 5 mm and 10 mm. FIG. 4(b) shows that while peaking occurs at a noise frequency of 2 KHz or thereabout when the depth X is 2.5 mm or 5 mm, it disappears when the depth X is 10 mm. On the other hand, FIG. 4(c) shows that when the depth X is 10 mm, no peaking occurs (i.e., no noise is generated at high sound ranges if the height H is at least 2 mm).

A description of the noise evaluation for abrasive articles formed according to embodiments described herein in reference to FIGS. 1 and 2 is continued below. Again, sample abrasive articles were made in which the height of the segment chip 12, the outer diameter, and the thickness of the circular substrate 11 of each abrasive article were the same as those of abrasive articles shown in Table 1 and in which the width W was 5 mm, the depth X was 5 mm, the height H 5 mm, and the angle α was 0 degrees, 5 degrees, 15 degrees or 20 degrees.

Table 3 summarizes the results of the noise evaluation for each of the example abrasive articles. Noise evaluation was conducted during idling of the example abrasive article according to the same procedure as was used for evaluating the K-Type and U-Type abrasive articles. An "x" mark in the table indicates that noise (i.e., wind noise) was generated at high sound ranges and a "o" in the table indicates that the noise level is lower than an allowable value.

TABLE 3

| | α (degree) | | | |
|---|---|---|---|---|
| | 0 | 5 | 15 | 20 |
| Noise Evaluation | X | o | o | o |

Figure 4D:
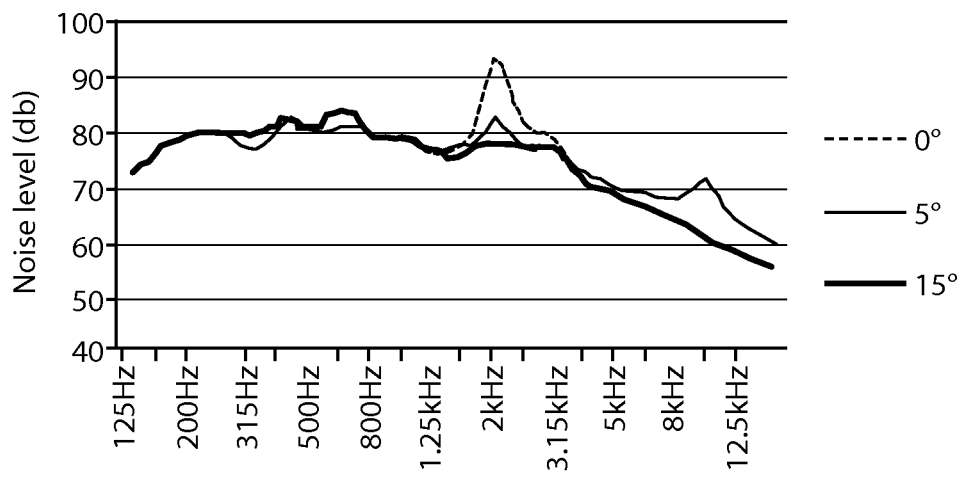
Figure 5:
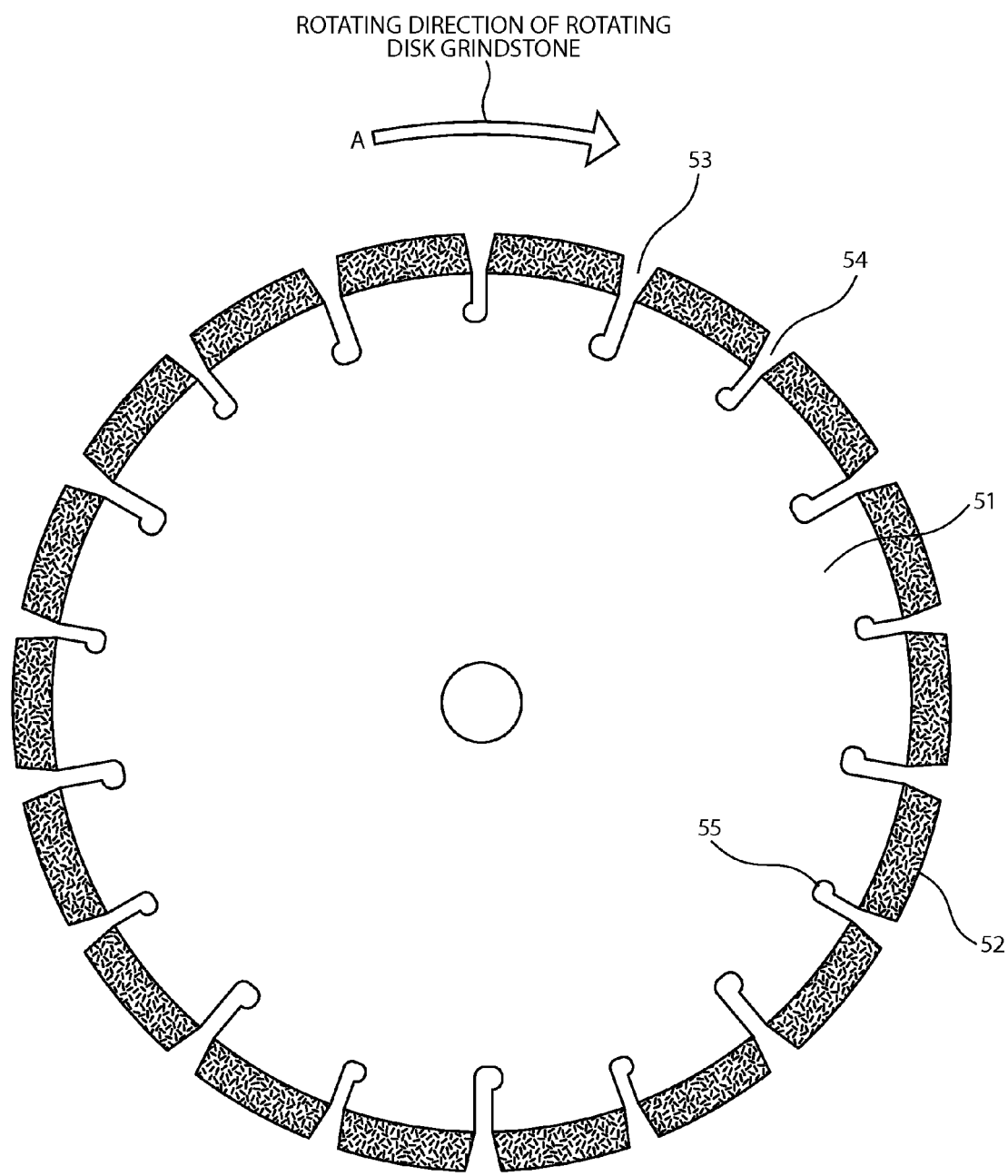
FIG. 5 includes a plan view of a rotating disk-shaped abrasive article described in Patent Literature 3.

Table 3 and FIG. 4(d), which shows Table 3 graphically, illustrate that noise at high sound ranges is reduced as the angle α is increased. In other words, the peaking at 2 KHz or thereabout in FIG. 4(d) decreases as the angle α increases from 0 degrees to 5 degrees to 15 degrees, and the peaking substantially disappears when the angle α is 15 degrees. As describe in Table 1, however, it is not possible to reduce noise at high sound ranges under all the conditions simply by increasing only the angle α. Table 3 shows results specifically where the abrasive articles have a depth X of 5 mm and in view of this condition (X=5 mm and the height H is somewhere between 5 mm and 10 mm) based on Table 2, this condition is close to the marginal condition, i.e., on the borderline whether peaking may occur or not; it is assumed that the condition can be changed from the marginal condition toward the condition where peaking is reduced by increasing the angle α under the present condition.

A description of the noise evaluation for abrasive articles formed according to embodiments described herein in reference to FIGS. 1 and 2 is continued below. Specifically, sample abrasive articles were formed using the same measurements as recorded in Table 2, but were adjusted to illustrate the relationship between the full length measurement and noise (i.e., wind noise) levels at high sound ranges. The full length measurement, shown as numeral values, represents the length from the common area between the center slot 32 and the noise-absorbing hole 33 to the end of the noise-absorbing hole. More specifically, given that a portion of the noise-absorbing hole 33 on the right hand side from the position P2 is an arc, the full length is a value found by adding (the height H/2) to the depth X. For example, given that the depth X is 10 mm and the height is 5 mm, the full length is 12.5 mm (10 mm+5 mm/2=12.5 mm).

Table 4 summarizes the results of the noise evaluation for each of the example abrasive articles. Noise evaluation was conducted during idling of the example abrasive article according to the same procedure as was used for evaluating the K-Type and U-Type abrasive articles. An "x" mark in the table indicates that noise (i.e., wind noise) was generated at high sound ranges and a "o" in the table indicates that the noise level is lower than an allowable value. No sample abrasive articles were made for conditions where the height H was 2 mm and the depth X was 2.5 mm or 5 mm.

TABLE 4

| | X (mm) | | |
|---|---|---|---|
| H (mm) | 2.5 | 5 | 10 |
| 2 | 3.5 (α = 0) | 6 (α = 0) | o<br>11 (α = 0) |
| 3 | x<br>4 (α = 0) | x<br>6.5 (α = 0) | o<br>11.5 (α = 0) |
| 5 | x<br>5 (α = 0) | o<br>7.5 (α ≥ 5) | o<br>12.5 (α = 0) |
| 10 | x<br>7.5 (α = 0) | o<br>10 (α = 0) | o<br>15 (α = 0) |

W = 5 mm

Table 4 shows that the noise level is equal to or lower than an allowable value when the full length is 7.5 mm or more except for conditions where the depth X is 2.5 mm and the height H is 10 mm. All the results show condition where the angle α of the slot is 0 degrees except for where the depth X is 5 mm and the height H is 5 mm (hereinafter "conditional A"). Although the noise level exceeds an allowable value in a sample abrasive article in which the angle α is 0 degrees under the condition A, it can be lowered to a level equal to or lower than the allowable value by making the angle α 5 degrees or higher under the same dimensional conditions.

The width of all sample abrasive articles described in Tables 1-4 above is 6 mm for the abrasive articles in Table 1 and 5 mm for the abrasive article in Tables 2-4. Next, Table 5 summarizes the results of the noise evaluation of abrasive articles having dimension conditions where: the width W is reduced to 4 mm; the depth X and the height H are the same as those of the abrasive articles in Table 4; and the angle α is made 0 degrees in all cases. Noise evaluation was conducted during idling of the example abrasive article according to the same procedure as was used for evaluating the K-Type and U-Type abrasive articles. An "x" mark in the table indicates that noise (i.e., wind noise) was generated at high sound ranges and a "o" in the table indicates that the noise level is lower than an allowable value.

TABLE 5

| | X (mm) | | |
|---|---|---|---|
| H (mm) | 2.5 | 5 | 10 |
| 2 | 3.5 (α = 0) | 6 (α = 0) | o<br>11 (α = 0) |
| 3 | x<br>4 (α = 0) | x<br>6.5 (α = 0) | o<br>11.5 (α = 0) |
| 5 | x<br>5 (α = 0) | o<br>7.5 (α = 0) | o<br>12.5 (α = 0) |
| 10 | x<br>7.5 (α = 0) | o<br>10 (α = 0) | o<br>15 (α = 0) |

W = 4 mm

Table 5 shows that even when angle α is 0 degrees, the noise level becomes equal to or lower than an allowable value when the full length is 7.5 mm or more except for condition where the depth X is 2.5 mm and the height H is 10 mm. While the noise level exceeds an allowable value in condition where the depth X is 5 mm, the height H is 5 mm, the angle α is 0 degrees and the width W is 5 mm, the noise level can be lowered to an allowable value or below by reducing the width W to 4 mm in conditions where the depth X is 5 mm, the height H is 5 mm and the angle α is 0 degrees.

Considered below are possible reasons for why the noise level is reduced as the full length is increased. The abrasive article formed according embodiments described herein has the mutually connected outlet slot 31, center slot 32 and noise-absorbing hole 33 and is configured such that wind noise generated at the area of the outlet slot 31 and the center slot 32 is attenuated by the noise-absorbing hole 33 such that no wind noise is generated from the abrasive article as a whole. In other words, the noise-absorbing hole 33 functions in such a way as to attenuate air vibration generated at the area of the outlet slot 31 and the center slot 32. The governing parameter of acoustic impedance for a region from the common area between the center slot 32 and the noise-absorbing hole 33 to the end of the noise-absorbing hole 33 is substantially the full length in view of the structure when the height H is constant and the depth X is longer than several mm. Since braking force against air vibration generated at the area of the outlet slot 31 and the center slot 32 increases as the full length is increased, the air vibration (wind noise) generated at the area of the outlet slot 31 and the center slot 32 can significantly be attenuated if the full length is set to a prescribed value or above.

Next, a description of the relationship between the shape of the rotating disk-shaped grinder described in Patent Literature 3 and the shape described in Table 2 is given below. The shape of the rotating disk-shaped grinder described in Patent Literature 3 substantially corresponds to the case in which the depth X is 2.5 mm and the height H 5 mm or 10 mm in Table 2, yet Table 2 shows that none of those conditions is effective in reducing wind noise. In other words, conditions are set in the noise-absorbing hole 33 according to embodiments described herein in such a way as to suppress the intrinsic vibration of a narrow band for the entire space including the outlet slot 31, the center slot 32 and the noise-absorbing hole 33, while the rotating disk-shaped grinder described in Patent Literature 3 neither considers those conditions at all nor describes any condition for suppressing the intrinsic vibration of a narrow band.

The following is the summary of the abovementioned point:

(1) Among variables, i.e., the depth X or full length of the noise-absorbing hole 33, the height H of the noise-absorbing hole 33 and the angle α of a slot, the sensitivity to noise (wind noise) at high sound ranges is the largest in the depth X or the full length, and wind noise declines as the depth X or the full length increases.

(2) In the case of an abrasive article characterized in that the outer diameter including the height of a segment chip, which is 12 mm, is 481 mm and the thickness of a circular substrate is 2.6 mm, wind noise decline to a level that practically causes no problem if the depth X exceeds 10 mm.

(3) The noise level declines as the width W becomes smaller.

(4) In general, the noise level declines as the height H is increased.

(5) The noise level tends to decline as the angle α is increased.

(6) When the width W is 5 mm, the noise level becomes equal to or lower than an allowable value under almost all conditions if the full length is 7.5 mm or more, and if the noise level exceeds an allowable value under some conditions, the noise level can be made equal to or lower than an allowable value by making the angle α 5 degrees or above. Moreover, if the width is 4 mm, the noise level becomes equal to or lower than an allowable value even when the angle α is 0 degrees except for the condition at the lower left corner in Table 5.

Although the relationship between the height H and noise was considered above, other points also need to be considered about the height H, including the mechanical strength of an abrasive article, measures against cracks at the time of cutting, and the performance of discharging chips. In other words, the problem is that the mechanical strength of the circular substrate 11 declines as the height H is increased and that on the contrary cracks tend to occur on the circular substrate 11 as the height H is decreased because stress added at the time of cutting cannot be mitigated. Furthermore, if the height H becomes 1 mm to 1.5 mm or so, chips stay along the slot 13 and the circular substrate 11 is worn away in a stripe-shaped manner such that the strength of the substrate declines or the substrate may be broken if worse comes to worst.

The depth X is also restricted in terms of mechanical strength. In other words, if the depth X is increased, two noise-absorbing holes 33 come closer to each other such that the metal plate area between those noise-absorbing holes 33 becomes narrow, which leads to a decline in mechanical strength. Therefore, while it is preferable to increase the depth X in order to reduce wind noise, it is necessary to reduce the depth X in order to maintain the mechanical strength of an abrasive article. Furthermore, the angle α is also restricted because the rigidity of the circular substrate 11 declines as the angle α is increased; therefore practically about 20 degrees is the limit.

Moreover, as the width W is decreased, not only the capability of supplying cooling water flowing through the slot 13 declines such that cooling performance is lowered, but it becomes difficult to smoothly discharge chips generated at the time of cutting as well. Accordingly, it is believed that the width W needs to have a minimum of 2 mm or more and preferably approximately 3 mm to 8 mm. It is assumed that the generation of wind noise can be suppressed even when the width is 2 mm.

In the abovementioned examples, we evaluated noise by rotating the abrasive article in the clockwise direction (e.g., in the same direction that the noise-absorbing hole protrudes) and found that if the abrasive article was rotated in the counterclockwise (e.g., in the direction opposite to the direction that the noise-absorbing hole protrudes), the noise level increased. More specifically, we found under the conditions in Table 3 that when the abrasive article was rotated in the counterclockwise direction, noise values increased in all cases as compared with when the abrasive article was rotated in the clockwise direction and that as the angle α is increased, the increasing rate of noise values rose. It was also confirmed experimentally that the effect of lowering the noise level was enhanced as the angle α was increased when the abrasive article was rotated in the clockwise direction. Accordingly, we found out that the rotation of the abrasive article according to embodiments described herein in the same direction that the noise-absorbing hole protrudes is extremely effective in lowering noise.

Although we described above that the noise-absorbing hole 33 extended approximately in the horizontal direction relative to the grinding direction (e.g., the rotating direction of the abrasive article) from the position P1 as shown in FIG. 3, the configuration may also be such that in addition to the noise-absorbing hole 33 described in FIG. 3, an auxiliary noise-absorbing hole is provided in the direction opposite to the grinding direction (e.g., the rotating direction of the abrasive article) from the position P1 in such a manner as to be connected to the center slot 32.

Furthermore, it is not necessary to configure the noise-absorbing hole 33 to be extended straight approximately in the horizontal direction relative to the grinding direction (the rotating direction of the abrasive article) from the position P1 as shown in FIG. 3. It may be configured such that the tip end of the noise-absorbing hole 33 is bent in the direction toward the center or in the circumferential direction to make a shape of the mouth turned down at the corners, a V shape, a U shape or an L shape designed in such a way that the tip end of the character L is bent in the direction toward the center or in the circumferential direction, or a hollow part wider than the tip end of this L shape may be provided in such a manner as to be connected to the tip end of this L shape.

In the foregoing, reference to specific embodiments and the connections of certain components is illustrative. It will be appreciated that reference to components as being coupled or connected is intended to disclose either direct connection between said components or indirect connection through one or more intervening components as will be appreciated to carry out the methods as discussed herein. As such, the above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

The Abstract of the Disclosure is provided to comply with Patent Law and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all features of any of the disclosed embodiments. Thus, the following claims are incorporated into the Detailed Description of the Drawings, with each claim standing on its own as defining separately claimed subject matter.

What is claimed is:

1. An abrasive article comprising:
   a circular substrate;
   a plurality of segments arranged on the circumferential surface of the circular substrate;
   an outlet slot defining an open space on a peripheral portion of the abrasive article between a first segment and a second segment;
   a center slot defining an open space in the circular substrate connected to the outlet slot, a noise absorbing hole connected to the center slot and protruding from the center slot in the rotating direction of the abrasive article; and
   a ratio $(H+X)/CS_D$ of at least about 0.02 and not greater than about 0.2, wherein H is equal to a prescribed height of the noise absorbing hole, X is equal to a prescribed depth of the noise absorbing hole and $CS_D$ is equal to the diameter of the circular substrate.

2. The abrasive article of claim 1, wherein the abrasive article further comprises a ratio $H/CS_D$ at least about 0.01 and not greater than about 0.2, wherein H is equal to a prescribed height of the noise absorbing hole and $CS_D$ is equal to the diameter of the circular substrate.

3. The abrasive article of claim 1, wherein the abrasive article further comprises a ratio $X/CS_D$ of at least about 0.01 and not greater than about 0.2, wherein X is equal to a prescribed depth of the noise absorbing hole and $CS_D$ is equal to the diameter of the circular substrate.

4. The abrasive article of claim 1, wherein the abrasive article further comprises a ratio $FL/CS_D$ of at least about 0.0075 and not greater than about 0.2, wherein FL is equal to a prescribed full length of the center slot and the noise absorbing hole and $CS_D$ is equal to the diameter of the circular substrate.

5. The abrasive article of claim 1, wherein the abrasive article further comprises an angle (α) of at least about 5 degrees.

6. The abrasive article of claim 5, wherein the abrasive article further comprises an angle (α) of not greater than about 45 degrees.

7. The abrasive article of claim 1, wherein the abrasive article further comprises a value (H+X) of at least about 10 mm and not greater than about 500 mm, wherein H is equal to a prescribed height of the noise absorbing hole and X is equal to a prescribed depth of the noise absorbing hole.

8. The abrasive article of claim 1, wherein the abrasive article further comprises a height (H) of at least about 5 mm and not greater than about 500 mm, wherein H is equal to a prescribed height of the noise absorbing hole.

9. The abrasive article of claim 1, wherein the abrasive article further comprises a depth (X) of at least about 10 mm and not greater than about 500 mm, wherein X is equal to a prescribed depth of the noise absorbing hole.

10. The abrasive article of claim 1, wherein the abrasive article further comprises a full length FL of at least about 7.5 mm and not greater than about 500 mm, wherein FL is equal to a prescribed full length of the center slot and the noise absorbing hole.

11. The abrasive article of claim 1, wherein the circular substrate comprises a diameter of at least about 100 mm and not greater than about 1000 mm.

12. The abrasive article of claim 1, wherein the circular substrate comprises a circumference of at least about 500 mm and not greater than about 5000 mm.

13. An abrasive article comprising:
    a circular substrate;
    a plurality of segments arranged on the circumferential surface of the circular substrate;
    an outlet slot defining an open space on a peripheral portion of the abrasive article between a first segment and a second segment;
    a center slot defining an open space in the circular substrate connected to the outlet slot, a noise absorbing hole connected to the center slot and protruding from the center slot in the rotating direction of the abrasive article;
    a ratio $(H+X)/CS_D$ of at least about 0.01 and a ratio $H/CS_D$ at least about 0.01 and not greater than about 0.2, wherein H is equal to a prescribed height of the noise absorbing hole, X is equal to a prescribed depth of the noise absorbing hole and $CS_D$ is equal to the diameter of the circular substrate.

14. The abrasive article of claim 13, wherein the abrasive article further comprises a ratio $FL/CS_D$ of at least about 0.0075 and not greater than about 0.2, wherein FL is equal to a prescribed full length of the center slot and the noise absorbing hole and $CS_D$ is equal to the diameter of the circular substrate.

15. The abrasive article of claim 13, wherein the abrasive article further comprises an angle (α) of at least about 5 degrees.

16. The abrasive article of claim 15, wherein the abrasive article further comprises an angle (α) of not greater than about 45 degrees.

17. An abrasive article comprising:
- a circular substrate;
- a plurality of segments arranged on the circumferential surface of the circular substrate;
- an outlet slot defining an open space on a peripheral portion of the abrasive article between a first segment and a second segment;
- a center slot defining an open space in the circular substrate connected to the outlet slot, a noise absorbing hole connected to the center slot and protruding from the center slot in the rotating direction of the abrasive article;
- a ratio $(H+X)/CS_D$ of at least about 0.01 and a ratio $X/CS_D$ of at least about 0.01 and not greater than about 0.2, wherein H is equal to a prescribed height of the noise absorbing hole, X is equal to a prescribed depth of the noise absorbing hole and $CS_D$ is equal to the diameter of the circular substrate.

18. The abrasive article of claim 17, wherein the abrasive article further comprises a value (H+X) of at least about 10 mm and not greater than about 500 mm, wherein H is equal to a prescribed height of the noise absorbing hole and X is equal to a prescribed depth of the noise absorbing hole.

19. The abrasive article of claim 17, wherein the abrasive article further comprises a height (H) of at least about 5 mm and not greater than about 500 mm, wherein H is equal to a prescribed height of the noise absorbing hole.

20. The abrasive article of claim 17, wherein the abrasive article further comprises a depth (X) of at least about 10 mm and not greater than about 500 mm, wherein X is equal to a prescribed depth of the noise absorbing hole.

* * * * *